United States Patent [19]
Horadan et al.

[11] Patent Number: 5,794,230
[45] Date of Patent: Aug. 11, 1998

[54] METHOD AND SYSTEM FOR CREATING AND SEARCHING DIRECTORIES ON A SERVER

[75] Inventors: Peter H. Horadan, Kirkland; Eric M. Candell, Seattle, both of Wash.

[73] Assignee: Microsoft Corporation, Redmond, Wash.

[21] Appl. No.: 671,771

[22] Filed: Jun. 28, 1996

[51] Int. Cl.⁶ .................................................. G06F 17/30
[52] U.S. Cl. ........................... 707/2; 707/3; 707/102; 707/104; 705/17; 705/41; 235/380; 380/24
[58] Field of Search ............... 380/24, 49; 707/102, 707/104, 2

[56] References Cited

U.S. PATENT DOCUMENTS

| | | | |
|---|---|---|---|
| 4,341,951 | 7/1982 | Benton | 705/41 |
| 4,390,968 | 6/1983 | Hennessy et al. | 380/24 |
| 4,683,536 | 7/1987 | Yamamoto | 705/17 |
| 4,689,478 | 8/1987 | Hale et al. | 235/380 |
| 5,220,501 | 6/1993 | Lawlor et al. | 707/3 |
| 5,655,117 | 8/1997 | Goldberg et al. | 395/613 |
| 5,655,177 | 8/1997 | Goldberg et al. | 707/102 |
| 5,659,742 | 8/1997 | Beattie et al. | 707/104 |
| 5,671,411 | 9/1997 | Watts et al. | 707/104 |

OTHER PUBLICATIONS

Chevy Chase Home Banking, Http://www.chevychasebank.com.
Signet OnLine, http://www.signet.com/online/bn-intro.htm, 1997.
BankNow with America Online, http://www.signet.com/online/bn-intro.htm, Jul. 1997.
PC Banking and Microsoft Money.
Chevy Chase Home Banking Signet Online, No Date.

*Primary Examiner*—Thomas G. Black
*Assistant Examiner*—Shahid Alam
*Attorney, Agent, or Firm*—Jones & Askew, LLP

[57] ABSTRACT

In association with a computer system, a method and system for storing and locating information pertaining to a particular financial institution that supports on-line services. Information relating to each financial institution is stored as a separate file on the server. The files on the server are organized in a file structure that includes subdirectories identified by the routing in transit number (RTN) or bank identification number (BIN) of the financial institution. The files relating to each financial institution and the subdirectories on the server are identified by the financial institution's (RTN) or BIN. A file is requested by sending a universal resource locator (URL) to the server. The URL identifies the server and also identifies a file path to the file stored on the server based on the RTN or BIN. The file is located on the server and downloaded to the client computer, where an application program extracts information regarding on-line services of the financial institution.

40 Claims, 5 Drawing Sheets

60 ↘  ⎧─────────────── 62 ───────────────⎫ ⎧──── 64 ────⎫
http://www.microsoft.com/msmoney/data/rtn/\<a\>/\<b\>/\<c\>.ini
                                          ╲   ╲    ╲    ╲
                                          66  68   70   72

76 ↘       ⎧──────────── 78 ────────────⎫
http://www.microsoft.com/msmoney/data/bin/\<d\>/\<e\>.ini
                                          ╲   ╲    ╲
                                          80  82   84

METHOD AND SYSTEM FOR CREATING AND SEARCHING DIRECTORIES ON A SERVER

CROSS-REFERENCE TO RELATED APPLICATION

This application claims the benefit of U.S. Provisional Application Ser. No. 60/013,482 filed Mar. 15, 1996.

TECHNICAL FIELD

The present invention relates generally to on-line services and, more specifically, to a system and method for creating and searching directories on a server to allow a client to efficiently obtain information relating to a particular financial institution.

BACKGROUND OF THE INVENTION

The increasing use of wide area networks such as the Internet has resulted in an explosion in the provision of on-line services. Computer users can access a vast wealth of information and services by utilizing a wide area network to establish a connection with other computers connected to the network.

The Internet, which represents a distributed computer network, is a worldwide network of computers belonging to various entities such as corporations, institutes of learning, and research organizations. The computers are connected by gateways that handle data transfer and conversion of messages from a sending network to the protocols used by a receiving network. The Internet is a collection of networks and gateways that use the TCP/IP suite of protocols. TCP/IP is an acronym for Transport Control Protocol/Interface Program, a software protocol developed by the Department of Defense for communications between computers.

Typically, the computers connected to a wide area network such as the Internet are identified as either servers or clients. A server is a computer that stores files that are available to other computers connected to the network. A client is a computer connected to the network that accesses shared resources provided by a server. To obtain information from a server, a client makes a request for a file or information located on the server using a specified protocol. Upon reception of a properly formatted request, the server downloads the file to the client.

The world wide web is a specific Internet network using specified Internet protocols. As is well known to those skilled in the art, communications between computers on the world wide web use the HTTP protocol. Files on a web server are identified by a universal resource locator (URL). A URL is a format for describing files on a server and describes both the name of the server and the path to the file on the server. For example, a URL for a web server may be constructed as follows: "http://<server>/<filepath>", where <server> identifies the server on which the file is located and <filepath> identifies the path to the file on the server. By knowing the name of the server and the correct file path to a file, a properly formatted URL can be created to allow a user to access any desired file on a server connected to the world wide web.

In connection with wide area networks such as the Internet, application programs are available for client computers to support specific types of on-line services. For example, application programs such as MICROSOFT MONEY version 4.0, manufactured by Microsoft Corporation, assignee of the present invention, supports on-line banking services between financial institutions and their customers. These services may include on-line bill payment capabilities that enable a user to write electronic checks and to send them to a processor for payment. The on-line services may also include on-line banking that enables a user to download account information such as balances, statements, to transfer funds between accounts, and apply for personal and secured loans.

The MICROSOFT MONEY application program allows a user to establish a connection between the user's computer (the client) and a computer at any of a large number of financial institutions that support on-line services. There are many different ways to establish a connection between the user's computer and the financial institution, and each individual financial institution determines the method by which a user must establish a connection. However, not all financial institutions may permit these connections or support on-line services. Typical application programs, such as MICROSOFT MONEY, obtain information regarding the identity of the financial institutions that support on-line services as well as the connection method required by each financial institution.

Various methods may be used for providing an application program with information regarding financial institutions that have on-line services. One method is to store this information on product disks that are sold with the application program disks. These product disks must be loaded onto the user's computer concurrently with the application program. However, the information relating to financial institutions is dynamic and changes often. For example, additional financial institutions may decide to support on-line services and/or change the connection method after the product disks have been shipped. Therefore, the financial institution information on product disks would quickly become out-of-date and inaccurate after the application program and product disks are purchased by the user with no efficient method of updating the information. Additionally, storing financial institution information on product disks and shipping these disks with the application program can result in increased costs and can require the user to devote storage space on the user's computer to store this information. Thus, it is disadvantageous to provide information regarding financial institutions on product disks.

Another method includes storing a single large database file on a server that includes a list of all participating financial institutions and corresponding connection methods associated with each financial institution. The entire database file can be downloaded to the user's computer on request and the database file can be searched for information relating to a particular financial institution. It will be appreciated that the list of participating financial institutions and the corresponding connection method of each participating financial institution can form a voluminous database. Because the HTTP protocol used in connection with web servers requires downloading entire files, this method is inefficient because it requires the server to download a massive database file to each client that requests the information.

Another method includes using a script or other server-side intelligence to search a database file on a server for information regarding a specific financial institution. However, this method has the disadvantage of requiring a development effort to create server-side intelligence that does not presently exist.

Therefore, a need exists for a central server to provide a client with a system for obtaining information from the server pertaining to a particular financial institution that requires neither using server-side intelligence nor downloading an entire database file.

SUMMARY OF THE INVENTION

The present invention is directed to a method and system for creating and searching directories on a server. One aspect of the invention relates to financial services and is directed to storing and locating information pertaining to a particular financial institution that supports on-line services. Information relating to each financial institution is stored as a separate file on a server. The files on the server are organized in a file structure that includes directories to permit the server to be efficiently searched to locate a desired file.

The file relating to each financial institution is identified by a unique identifier, such as the financial institution's routing in transit number (RTN) or the financial institution's bank identification number (BIN). The RTN is used in the check-clearing process and uniquely identifies the financial institution. The RTN comprises a nine digit number printed on the bottom left portion of checks. The BIN is used for credit card clearing and comprises the first six numbers of a credit card number. As with an RTN, a BIN uniquely identifies a particular financial institution. Although each RTN and BIN identifies a single financial institution, a single financial institution may have multiple RTNs and BINs associated with it.

To access on the server a file that pertains to a particular financial institution, the server is accessed through a wide area network such as the Internet or a private dial-up network. The user (client) uses an application program that supports on-line services to request that the desired file be located on the server. A universal resource locator (URL) relating to the desired file is sent to the server, which locates and downloads the file to the client. The URL identifies the server and also identifies a file path to the file stored on the server. The URL uses the RTN or BIN of the desired financial institution to locate the file corresponding to the desired financial institution.

The file path specified by the URL includes an entry to identify whether the file is identified by an RTN or BIN by using the entries "rtn" or "bin", respectively. In an exemplary embodiment, the file path further includes directories that are identified by the RTN or the BIN, broken into three digit increments. For example, if a financial institution has an RTN of 123456789, the URL for locating the file on the server pertaining to the financial institution might be:

http://www.microsoft.com/msmoney/data/rtn/123/456/789.ini.

Similarly, if a financial institution has an BIN of 123456, the URL for locating the file on the server pertaining to the financial institution might be:

http://www.microsoft.com/msmoney/data/bin/123/456.ini

Each entry in the URL after "/data/" identifies a directory on the server. Each successive entry is a directory that is contained within the prior directory. By utilizing multiple directories, the file relating to a particular financial institution can be located with an efficient search of the directories. Additionally, because the server is implemented as a web server, no additional server-side intelligence is required at the server to locate and download a file. Furthermore, each file relating to a specific financial institution is relatively small such that downloading to the client computer is accomplished quickly because only information pertaining to the desired financial institution is downloaded.

When a desired file is downloaded from the server to the client computer, the application program can determine information regarding a particular financial institution including the available on-line services and the method of connection with the financial institution. With this information, a connection can be established with a computer associated with a financial institution to utilize the on-line services offered by the financial institution.

DETAILED DESCRIPTION

Figure 1:
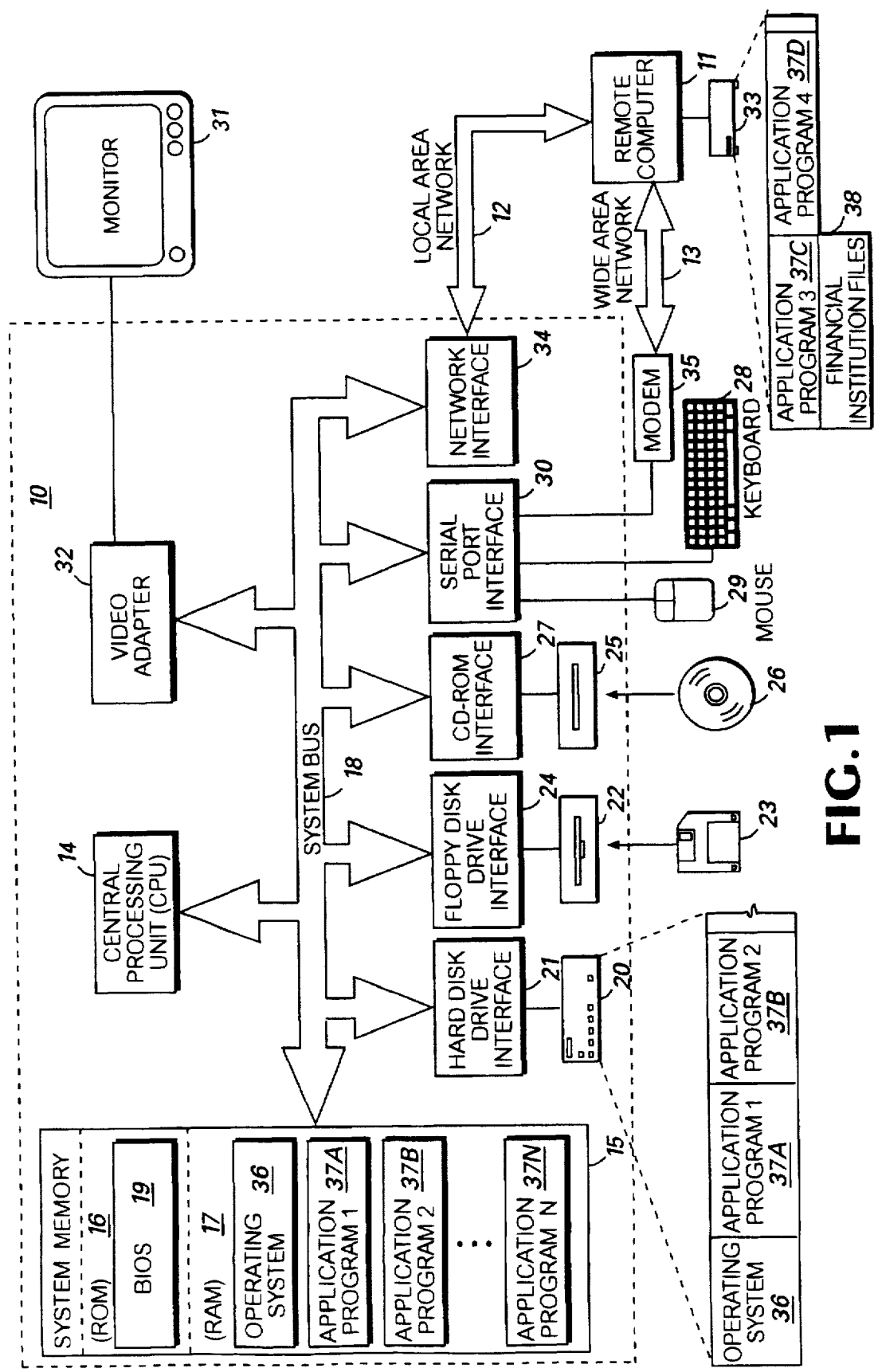
FIG. 1 is a first block diagram of a computer system representing the operating environment for the preferred embodiment of the present invention.

The present invention is directed to a method and system for creating and searching directories on a server. The preferred embodiment of the present invention is directed to a server that provides information to a client relating to financial institutions and associated on-line services. The present invention includes a file structure on a server, including files pertaining to particular financial institutions, which permits a selected file to be easily located with an efficient search initiated by a client. The file structure is based on a unique identifier of each financial institution, such as the routing in transit number (RTN) or bank identification number (BIN). The file structure includes progressive directories that are used to navigate the file structure for locating a file corresponding to a specific financial institution. The located file is then downloaded to the client to support operation of a program that supports on-line services. The program extracts information from the file to establish a connection with the financial institution's computer.

Although the preferred embodiment will be generally described in the context of an application program and an operating system running on a personal computer, those skilled in the art will recognize that the present invention also can be implemented in conjunction with other program modules for other types of computers. Furthermore, those skilled in the art will recognize that the present invention may be implemented in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet. Accordingly, it will be understood that the terms computer, operating system, and application program generally include all types of computers and the program modules designed for them.

Turning first to the nomenclature of the specification, the detailed description which follows is represented largely in terms of processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. Each of these conventional distributed computing components is accessible to the local processing unit by a communication network.

The processes and operations performed by the computer include the manipulation of data bits by a local processing unit or remote server and the maintenance of these bits within data structures resident in one or more of the local or remote memory storage devices. These data structures impose a physical organization upon the collection of data bits stored within a memory storage device and represent specific electrical or magnetic elements. Symbolic representations are the means used by those skilled in the art of computer programming and computer construction to most effectively convey teachings and discoveries to others skilled in the art.

For the purposes of this discussion, a process is generally defined as being a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general purpose digital computers or other similar computing devices.

In addition, it should be understood that the programs, processes, method, etc. described herein are not related or limited to any particular computer or apparatus nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Turning now to the drawings, in which like numerals indicate like elements throughout the several figures, FIG. 1 illustrates a computer system on which the preferred embodiment of the present invention is implemented. As shown in FIG. 1, the computer 10 is in a networked environment with logical connections to a remote computer 11. The logical connections between the computer 10 and the remote computer 11 are represented by a local area network 12 and a wide area network 13. Those of ordinary skill in the art will recognize that in this client/server configuration, the remote computer 11 may function as a file server or computer server.

The computer 10 includes a central processing unit 14, such as the 80486 or "PENTIUM" microprocessors manufactured by Intel Corporation of Santa Clara, Calif. The processing unit 14 is not limited to an Intel-model processor, and can be implemented by other processors such as a member of the MIPS family by Silicon Graphics, Inc. or a PowerPC processor by Motorola Corporation. The computer also includes system memory 15, including read only memory (ROM) 16 and random access memory (RAM) 17, connected to the processing unit by the system bus 18. The BIOS 19 for the computer 10 is stored in ROM 16. Those skilled in the art will recognize that the BIOS 19 is a set of basic routines that helps to transfer information between elements within the computer 10.

Within the computer 10, a local hard disk drive 20 is connected to the system bus 18 via the hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the computer 10 by using a keyboard 28 and/or pointing device, such as a mouse 29, which are connected to the system bus 18 via a serial port interface 30. Other types of pointing devices may include track pads, track balls, data gloves, head-trackers, pens, and other devices suitable for positioning a cursor on a computer monitor 31. The computer monitor 31 includes a pixel-oriented computer screen 31a on which images are displayed. The monitor 31 or other kind of display device is connected to the system bus 18 via a video adapter 32.

The remote computer 11 in the networked environment shown in FIG. 1 is connected to a remote memory storage device 33. This remote memory storage device 33 is typically a large capacity device such as a hard disk drive, CD-ROM drive, magneto-optical drive or the like. In accordance with the present invention, the remote memory storage device 33 stores files 38 associated with specific financial institutions. These files 38 are organized in progressive directories and contain information relating to particular financial institutions, as will be described further below.

The computer 10 is connected to the remote computer 11 by a network interface 34, which is used to communicate over the local area network 12. As shown in FIG. 1, the computer 10 may also be connected to the remote computer 11 by a modem 35, which is used to communicate over the wide area network 13, such as the Internet. The modem 35 is connected to the system bus 18 via the serial port interface 30. Typically, the modem 35 is also connected to a communications network such as the public switched telephone network (PSTN) or a community antenna television network (CATV). Although illustrated in FIG. 1 as external to the computer 10, those of ordinary skill in the art will recognize that a modem 35 may also be internal to the computer 10, thus communicating directly via the system bus 18. It is important to note that connection to the remote computer 11 via both the local area network 12 and the wide area network 13 is not required, but merely illustrates alternative methods of providing a communication path between the computer 10 and the remote computer 11.

Although many other internal components of the computer 10 are not shown, those of ordinary skill in the art will appreciate that such components and the interconnection between them are well known. Accordingly, additional details concerning the internal construction of the computer 10 need not be disclosed in connection with the present invention. It should also be understood that the components and operation of computer 10, as described in FIG. 1, may also be provided within remote computer 11.

Those skilled in the art will understand that program modules such as an operating system 36, application programs 37, and data are provided to the computer 10 via one of the local or remote memory storage devices, which may include the local hard disk drive 20, floppy disk 23, CD-ROM 26, RAM 17, ROM 16, and the remote memory storage device 33. In the preferred computer 10, the local hard disk drive 20 is used to store data and programs, including the operating system and application programs. The program module or application programs 37 preferably include a program that supports on-line banking services.

In accordance with the preferred embodiment of the present invention, a user can cause computer 10 to run an application program that supports on-line banking services between a financial institution and the computer 10. Aspects of the embodiment disclosed herein will be described with reference to the MICROSOFT MONEY application program, manufactured and sold by Microsoft Corporation, assignee of the present invention. However, it should be understood that the present invention is not limited in scope to any particular application program or program module. To the contrary, the present invention is envisioned to be useful and capable of being incorporated into any computer program that supports on-line services. Furthermore, the present invention is not limited merely to on-line services relating to banking, but can be adapted to be implemented in a wide range of on-line services in many different fields.

Figures 2, 3A, 3B:
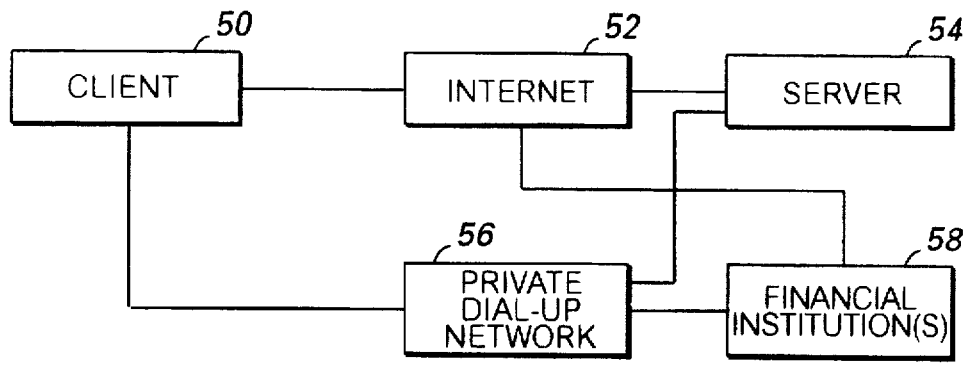
FIG. 2 is a second block diagram of a distributed computer network representing the operating environment for the preferred embodiment of the present invention.
FIGS. 3A and 3B are illustrations showing the format of a URL for locating a file stored on a server in accordance with the preferred embodiment of the present invention.

FIG. 2 is a block diagram showing the distributed network environment in which the present invention is implemented. The client computer 50, which corresponds to computer 10 in FIG. 1, is running an application program such as MICROSOFT MONEY, which supports on-line banking services. The client 50 is connected to a server 54 preferably via the Internet 52, but may also be connected via a private dial-up network 56. The server 54, which corresponds to remote computer 11 and remote memory storage device 33 in FIG. 1, stores files relating to a plurality of financial institutions. These files are organized in a unique file structure, as will be discussed more fully below. It should be appreciated that the unique file structure described herein is a physical organization of data and files stored on the memory storage device 33 of the server.

The server is implemented as a web server using the HTTP protocol to leverage the tools of operating systems, such as Microsoft WINDOWS, which provide easy use and interaction with web servers. The built-in intelligence of the web server is relied upon by the client to navigate the file structure on the server in an efficient manner. In one embodiment of the invention, the server is a part of the "www.microsoft.com" domain, which is created and operated by Microsoft Corporation, assignee of the present invention. However, the present invention is not limited merely to such a server and is envisioned to be useful for any server that can be accessed by a client computer. The client 50 can also be connected to a computer associated with a financial institution 58 via the Internet 52 or the private dial-up network 56 to permit the user to utilize on-line banking services provided by the financial institution.

The files stored on the server 54 pertain to many different financial institutions that support on-line services. For each financial institution, the server 54 stores a file based on the financial institution's RTN or BIN. The RTN, which is used in the check-clearing process and uniquely identifies a financial institution, comprises a nine digit number printed on the bottom left portion of checks. The BIN is used for credit card clearing and comprises the first six numbers of a credit card number. As with an RTN, a BIN uniquely identifies a particular financial institution. Although each RTN and BIN identifies a single financial institution, a single financial institution may have multiple RTNs and BINs associated with it.

As stated above, the server 54 stores files containing information relating to particular financial institutions. This information is accessed by a program on the user's computer, i.e., the client 50, to support the configuration of the program to utilize a financial institution's on-line services. A link is established between the client 50 and the financial institution's computer 58 either through the Internet 52 or through a private dial-up network 56.

For example, the MICROSOFT MONEY application program allows the client 50 to connect to the server 54 through a private dial-up network 56 running the Point-to-Point protocol. The private dial-up network 56 should preferably run the TCP/IP, HTTP, and PCT or SSL protocol, as is well known to those skilled in the art. The MICROSOFT MONEY application program allows the client 50 to connect to the server 54 through the Internet 52 using Internet access software typically provided in the software within the operating system running on the user's computer, such as Microsoft WINDOWS.

To access a file on the server 54, the file pertaining to a particular financial institution is located on the server and downloaded to the user's computer. The file is identified by the RTN or BIN of the financial institution. In response to a prompt generated by the program, the user enters the RTN or BIN of the financial institution. In response, the program creates a URL to request the file based on the entered RTN or BIN. The format for the URL is shown in FIGS. 3A and 3B.

FIG. 3A shows the format of the URL for locating on a server information for a financial institution identified by an RTN. The URL is generally shown at 60. The URL includes a server identifier, "www.microsoft.com/msmoney/data/", shown at 62. The URL also includes a file path identifier "rtn/<a>/<b>/<c>.ini", shown at 64. The file path identifier is further broken down into directories 66, 68, and 70. The last entry in the URL is a file name 72. Proceeding from left to right, a first directory 66 determines whether the financial institution is identified by an RTN or BIN. The directory "rtn" indicates that the financial institution is identified by a particular RTN, whereas the directory "bin" indicates that the financial institution is identified by a particular BIN. The URL of FIG. 3A uses the "rtn" directory 66 and the URL of FIG. 3B uses the "bin" directory 80.

In FIG. 3A, other directories identified in the URL are "<a>" 68 and "<b>" 70. The file name is identified as "<c>" 72. The directory "<a>" corresponds to the first three digits of the RTN, directory "<b>" corresponds to the middle three digits of the RTN, and file name "<c>" corresponds to the last three digits of the RTN. The use of the extension, i.e., ".ini", is arbitrary. The choice of the ".ini" extension is customary for configuration-type files in the Windows operating system environment.

So, for example, if a financial institution has an RTN of 123456789, the URL for locating the file on the server pertaining to the financial institution would be:

http://www.microsoft.com/msmoney/data/rtn/123/456/789.ini

It should be understood that the above URL contains a server identifier that is directed toward a server implemented as part of the www.microsoft.com domain. However, other servers that are not a part of this domain may be utilized to implement the present invention. If other servers are used, the content, but not the functionality, of the URL above will be altered. Additionally, those skilled in the art will appreciate that other file paths using the same RTN or BIN may also be used to implement the present invention.

Similarly, in FIG. 3B, the URL is shown generally at 76. The server identifier is shown at 78, and is identical to the server identifier in FIG. 3A. Directories in the URL are identified as "bin" 80 and "<d>" 82. File name "<e>" is identified as 84. The directory "<d>" corresponds to the first three digits of the BIN and file name directory "<e>" corresponds to the last three digits of the BIN. As stated above with reference to FIG. 3A, the extension ".ini" is arbitrary. So, for example, if a financial institution has an BIN of 123456, the URL for locating the file on the server pertaining to the financial institution would be:

http://www.microsoft.com/msmoney/data/bin/123/456.ini

The last three digits of an RTN or BIN, identified as reference numerals 72 and 84 in FIGS. 3A and 3B, respectively, correspond to the file namelocated desired file located on the server. Each file name identifies a file pertaining to a particular financial institution and includes another URL which is a pointer to another file that includes information on how to connect to a computer associated with a specific financial institution. Therefore, the server 54 includes files associated with each financial institution, which do not necessarily include all desired information relating to the actual on-line services supported by a financial institution. Instead these files include information on where to find information specifically relating to a financial institution's on-line services and how to access such information. After such information in retrieved from the server 54, the application program can establish a connection with the computer associated with a financial institution to obtain information related to on-line banking and other services.

Breaking the URL into several levels of directories allows the desired file on the server to be located faster and more efficiently. Obviously, a nine digit RTN allows for one billion different RTNs and a six digit BIN allows for one million different BINS. By using directories corresponding to three digits of an RTN or BIN, each directory can contain a maximum of one thousand entries, thus making the searching process much less cumbersome.

The progressive levels of directories provided in the disclosed embodiment is shown in the URL of FIG. 3A, for which all files identified by "<c>" are located within directory "<b>"; all directories identified by "<b>" are located within a directory "<a>"; and all directories identified by "<a>" are located within directory "rtn". In the example of FIG. 3A, directory "<b>" can be termed a "subdirectory" of "<a>", and "<a>" can be termed a subdirectory of directory "rtn". This progressive file structure is further illustrated with reference to FIG. 3C.

Figure 3C:
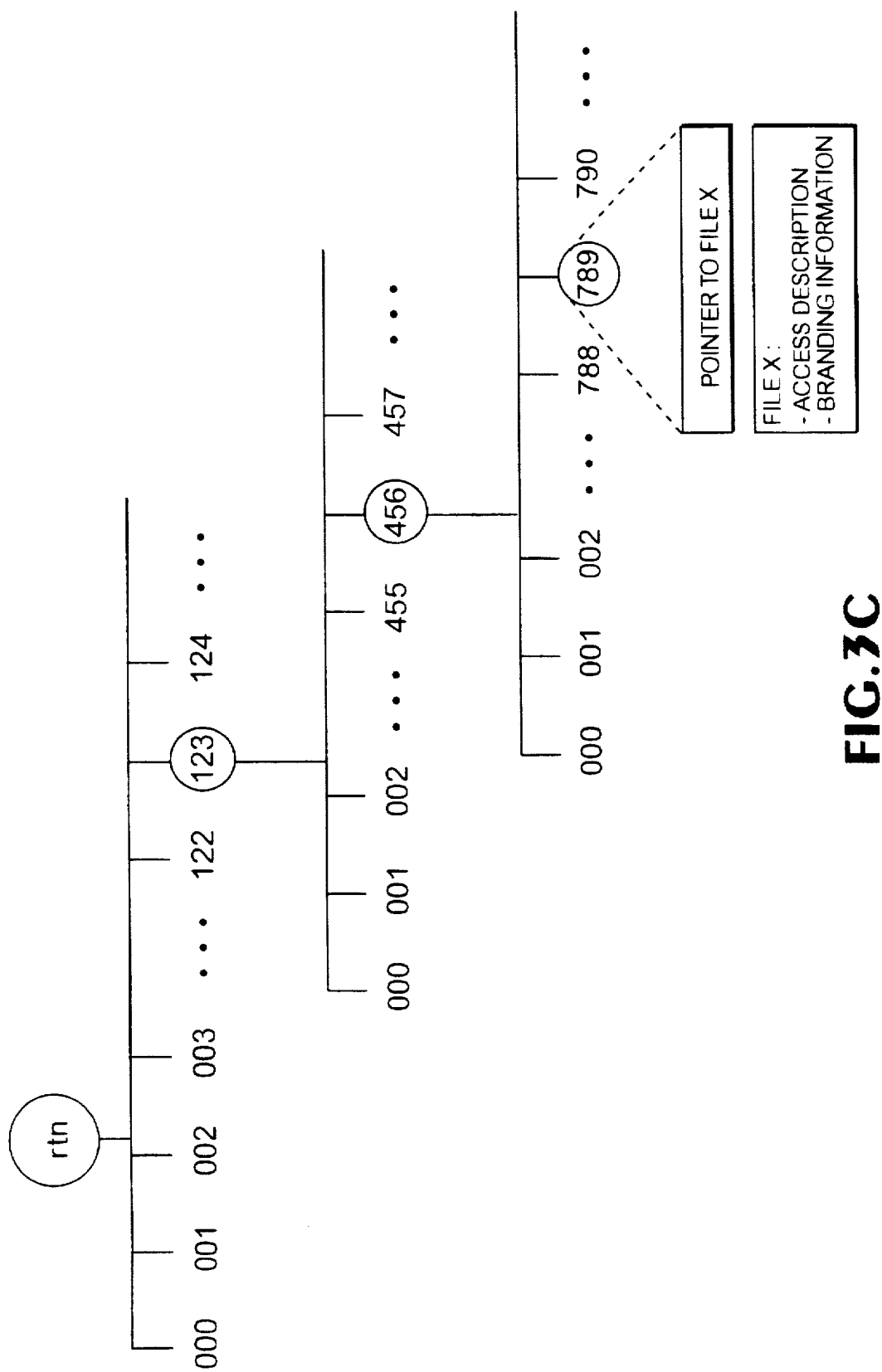
FIG. 3C is an example of the progressive directories and file name file structure on the server, based on the RTN of a particular financial institution, in accordance with an embodiment of the present invention.

In FIG. 3C, the directory "rtn" includes up to one thousand directories identified by the first three digits of the RTN. It should be understood that FIG. 3C includes only directories associated with the RTN of a financial institution, but the file structure of the preferred embodiment of the present invention also includes directories associated with the BIN of the financial institution that are not illustrated in FIG. 3C. For the sake of the example of FIG. 3C, the directories and file name are identified in the URL of FIG. 3A as "rtn/123/456/789. File name "789" is included within subdirectory "456"; subdirectory "456" is included within subdirectory "123"; and subdirectory "123" is included within directory "rtn".

As seen in FIG. 3C, subdirectories "000", "001", "002", ... "997", "998", "999", identified by the first three digits of the RTN, are contained within the directory "rtn". Similarly, subdirectories "000", "001", "002", ... "997", "998", "999", identified by the middle three digits of the RTN, are contained within the subdirectory identified by the first three digits of the RTN. Similarly, file names "000", "001", "002", ... "997", "998", "999", identified by the last three digits of the RTN, are contained within the subdirectory identified by the middle three digits of the RTN. For the sake of the example of FIG. 3C, file name "789" is included within subdirectory "456"; which is included within subdirectory "123", which is included within directory "rtn".

The information contained in the file identified by the pointer described above includes an "access description" that includes information on how to connect to the financial institution's computer. The information in the file also includes "branding information" that includes information such as the financial institution's logo and e-mail address. When the application program retrieves such information, the program can establish a connection with a computer associated with a financial institution to obtain information related to on-line banking and other services. In FIG. 3C, file name "789" includes a pointer to another file that includes relevant information regarding a specified financial institution's on-line services, such as an access description and branding information.

This progressive file structure increases the efficiency for locating a file on the server because each directory contains a maximum of one thousand items, based on the three digit identifier of directories or files within each directory.

The method of requesting, locating, and downloading a file stored on the server in accordance with the disclosed embodiment of the present invention is described with reference to the flow chart of FIG. 4. The method begins at START step 100. At step 105, the application program prompts the user to enter an RTN or a BIN for a financial institution for which the user wishes to obtain information regarding on-line services. At step 100, the application program determines whether the format of the RTN or the BIN entered by the user is valid. For example, the application program checks to verify that the RTN includes nine digits or that the BIN includes six digits.

At step 115, the application program creates a URL using the RTN or BIN entered by the user. The application program formats the URL as described above with reference to FIGS. 3A and 3B. At step 120, the application program makes a request to the operating system to retrieve the URL. It should be understood by those skilled in the art that a web browser, such as NETSCAPE NAVIGATOR or INTERNET EXPLORER, which is separate from the operating system, may be used in the implementation of steps discussed herein that involve the operating system. After retrieving the URL, the operating system locates and connects to the server identified by the URL at step 125. This connection is preferably accomplished via a wide area network such as the Internet or a private dial-up network. At step 130, the operating system requests from the server the file identified in the URL.

At step 135, the server receives the request and the URL from the operating system. At step 140, the file structure is navigated according to the subdirectories and file name included in the URL to attempt to locate the file. At step 141, it is determined whether the file was located. If the file specified in the URL is located on the server, the method follows "yes" branch 142 to step 144. At step 144, the server downloads the file to the operating system. The operating system receives the downloaded file and transfers the contents of the file to the application program at step 145. At step 150, the application program opens the file to locate the access and branding information contained therein. The method terminates at END step 155. After obtaining this information, a connection can be established with a computer associated with the financial institution either via the Internet or a private dial-up network to utilize any on-line services offered by the financial institution.

If the file specified in the URL is not located on the server, as determined at step 141, the method follows "no" branch 143 to step 148. At step 148, the server returns a "file not found" message to the operating system. The operating system, at step 149, passes the message to the application program. The application program may then conclude that the particular RTN or BIN used in the URL are not assigned to any financial institution or that the financial institution associated with the RTN or BIN does not offer on-line services. The application program may also display a corresponding message to the user that the particular RTN or BIN identified no file located on the server or that no on-line services are available for the financial institution identified by the particular RTN or BIN. The method then terminates at END step 155.

Figure 4:
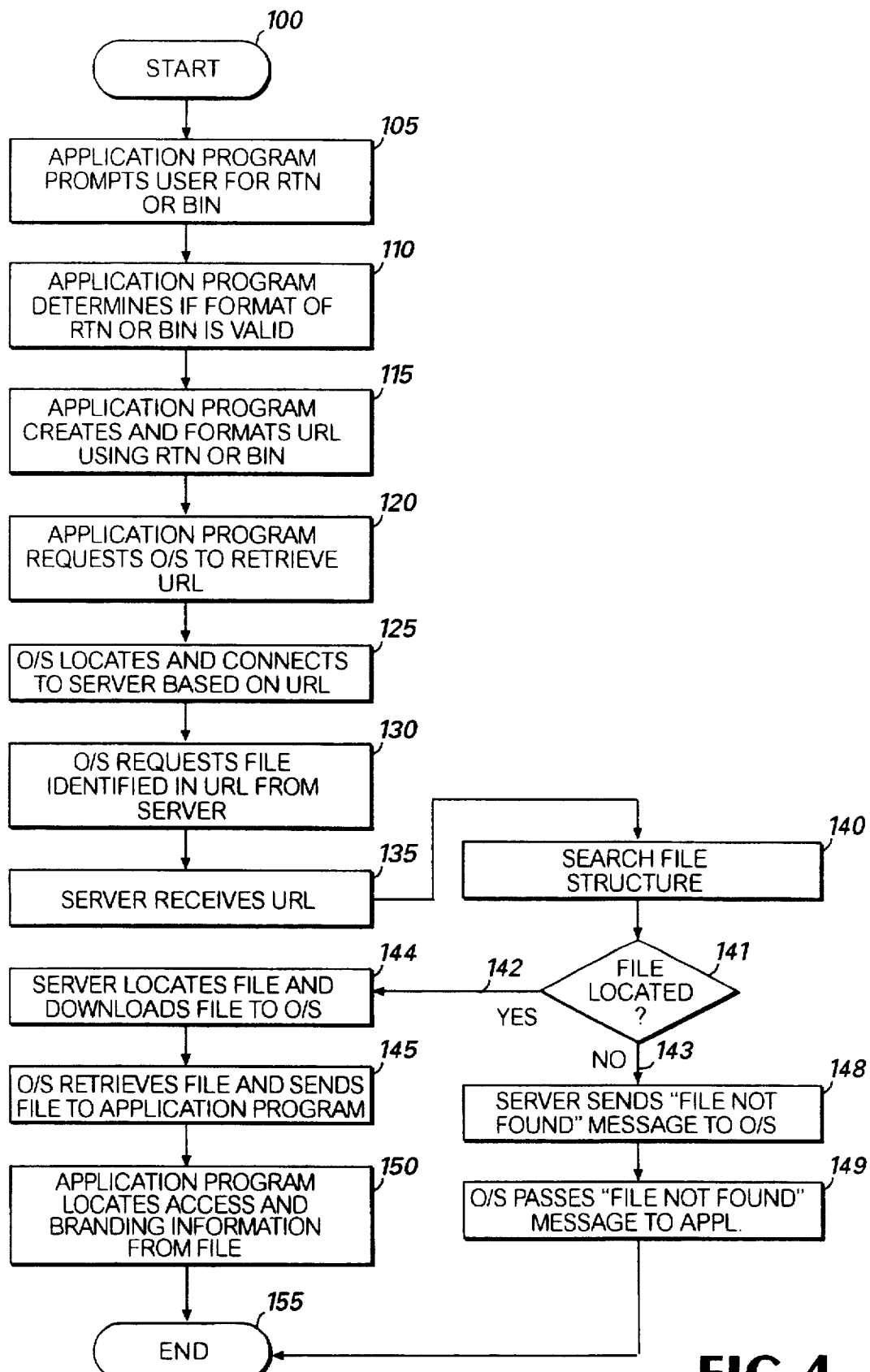
FIG. 4 is a flow chart illustrating the method of requesting, locating, and downloading a desired file on a server in accordance with a preferred embodiment of the present invention.
Figure 5:
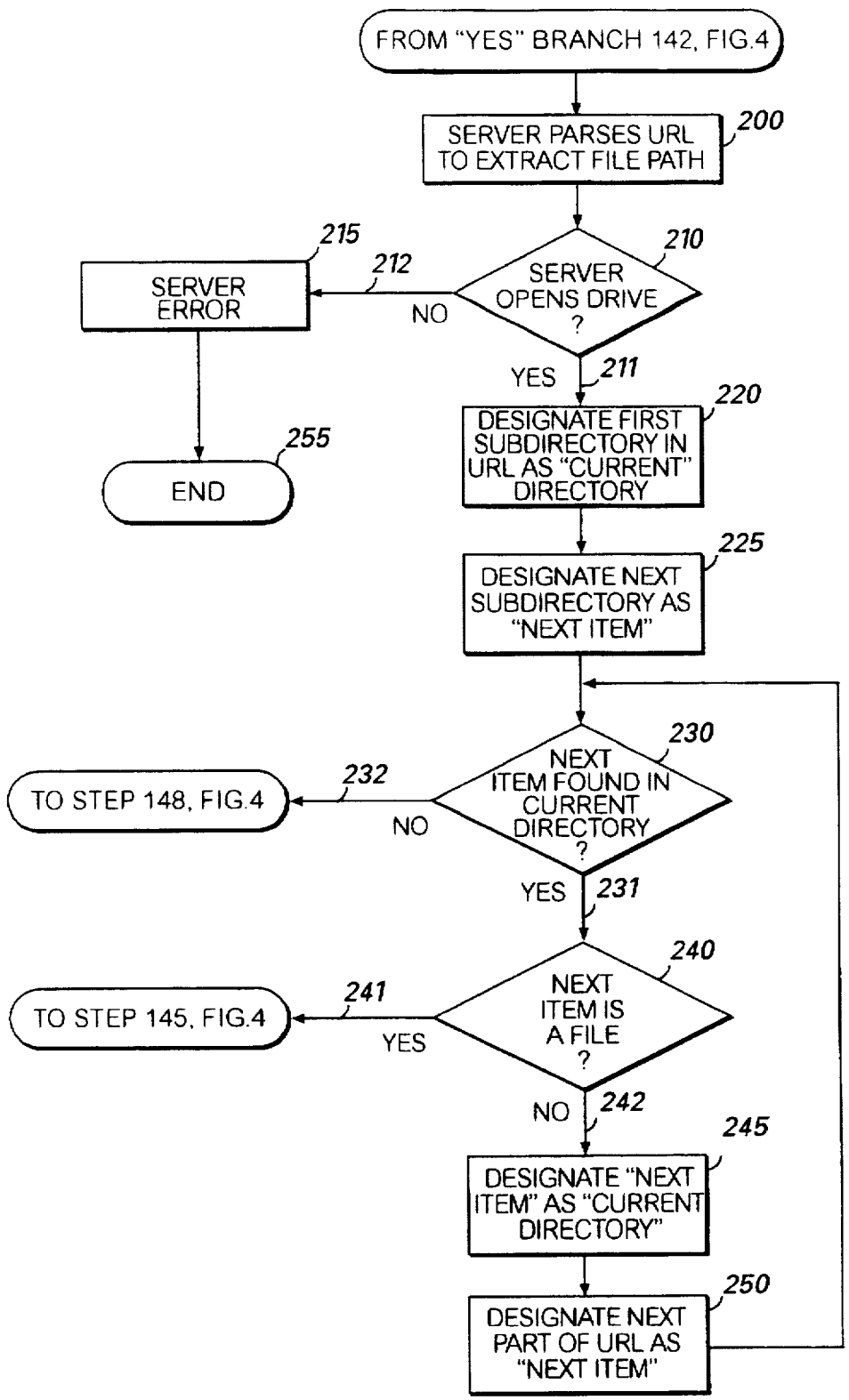
FIG. 5 is a flow chart illustrating the steps for locating and downloading a desired file, as generally shown in FIG. 4, in accordance with the preferred embodiment of the present invention.

FIG. 5 further describes the operations performed by the server in step 144 of FIG. 4. In response to the server receiving the URL from the operating system of the user's computer at step 135 of FIG. 4, the server parses the URL and extracts the file path identified therein in a manner well known to those skilled in the art, as shown in FIG. 5 at step 200. At step 210, it is determined whether the server opens the drive that contains the requested file. Those skilled in the art will understand that the server is configured to know which of its drives contain files that are used to answer requests from clients. In some cases, portions of the URL sent from the client may implicitly be used by the server to select a drive from among various drives. However, the selection of drives by the server is transparent to the client's application program. If the server cannot open the drive, the method follows "no" branch 212 to step 215, where a "server error" message is returned to the operating system of the user's computer. The method then terminates at END step 255. If the server opens the drive, the method follows "yes" branch 211 to step 220.

At step 220, the first subdirectory identified in the URL is designated as the "current directory". At step 225, the next subdirectory in the URL is designated as the "next item". For example, in the URL shown in FIG. 3A, the current directory would be "rtn" and the next item would be "123".

At step 230, it is determined whether the next item is found in the current directory. If the next item is not found in the current directory, the method follows "no" branch 232 to step 148 of FIG. 4, where a "file not found" error message is sent to the operating system of the user's computer. Conversely, if the next item is found in the current directory, the method follows "yes" branch 231 to step 240.

At step 240, it is determined whether the next item is a file, rather than a subdirectory. This occurs when there are no other subdirectories below the next item identified in the URL. If the next item is a file, the method follows "yes" branch 241 and proceeds to step 145 of FIG. 4. If, at step 240, it is determined that the next item is not a file, the method follows "no" branch 242 to step 245.

At step 245, the next item is designated as the current directory. At step 250, the next part of the file path in the URL is designated as the next item and the method returns to step 230.

From the foregoing, it will be appreciated that the disclosed embodiment of the present invention overcomes the drawbacks of the prior art described hereinabove. Specifically, the file structure of the server and the subdirectories identified by the URL allow a file pertaining to a specific financial institution to be located and downloaded from the server to the client computer. The present invention eliminates the need to download a massive database file containing information on all financial institutions. The present invention is implemented generally by an application program residing on a client, thereby eliminating any need for developing additional server-side intelligence. From the description of the disclosed embodiment, equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. A method for downloading a file containing information about an institution from a memory storage device on a server to a client computer, the institution being identified by a unique identifier comprising a predetermined plurality of symbols, comprising the steps of:

(a) maintaining information relating to a plurality of institutions in respective files stored on the memory storage device of the server, wherein each respective file is identified by a unique filepath;

(b) transmitting, in response to input from a user of the client computer, a request from the client computer to the server for a specific file identified by a specific filepath, the filepath including the unique identifier;

(c) at the server, parsing the unique identifier into predetermined segments comprising a subset of said symbols, the segments corresponding respectively to a directory at least one subdirectory, and a file name;

(d) searching the server using the segments of the unique identifier to locate the specific file as identified within the directory, the at least one subdirectory, and the file name; and (e) downloading the specific file from the server to the client computer.

2. The method of claim 1 wherein each file is associated with a respective financial institution.

3. The method of claim 2 wherein the directory identifies that the filepath includes the routing in transit number (RTN) of a financial institution.

4. The method of claim 3 wherein a first subdirectory is identified by a segment of the unique identifier comprising the first three digits of the RTN.

5. The method of claim 3 wherein a second subdirectory is identified by a segment of the unique identifier comprising the middle three digits of the RTN.

6. The method of claim 3 wherein the file name is identified by a segment of the unique identifier comprising the last three digits of the RTN.

7. The method of claim 2 wherein the directory identifies that the filepath includes the bank identification number (BIN) of a financial institution.

8. The method of claim 7 wherein a first subdirectory is identified by a segment of the unique identifier comprising the first three digits of the BIN.

9. The method of claim 7 wherein the file name is identified by a segment of the unique identifier comprising the last three digits of the BIN.

10. The method of claim 2 wherein the specific file includes a pointer identifying another file including information regarding the on-line services offered by the respective financial institution.

11. The method of claim 10 wherein the information is used to configure a program module running on the client computer to utilize the on-line services offered by the financial institution.

12. The method of claim 1 wherein the request is in the form of a URL that includes the unique identifier.

13. The method of claim 1 wherein the client computer is connected to the server through the Internet.

14. The method of claim 1 wherein the client computer is connected to the server through a private dial-up network.

15. The medium of claim 1 wherein the request is in the form of a URL that includes the unique identifier.

16. A computer system including a client and a server, the client being operative to execute a program module for allowing the client to download a file stored on the server, the server comprising:

a memory for storing files containing information relating to a plurality of respective institutions, each institution being identified by a unique identifier comprising a predetermined plurality of symbols, each file being identified by a unique filepath; and a processing device, coupled to said memory, for searching and locating a specific file;

and the client comprising:

a memory for storing the program module;

a processing device, responsive to instructions from the program module, operative to:

connect the client to the server;

transmit, in response to input from a user of the client computer, a request to the server for a specific file identified by a specific filepath, the filepath including a unique identifier;

parse the unique identifier into predetermined segments comprising a subset of said symbols, the segments corresponding respectively to a directory, at least one subdirectory, and a file name;

search the server using the segments of the unique identifier to locate the specific file as identified within the directory, the at least one subdirectory, and the file name; and receive the downloaded specific file from the server.

17. The system of claim 16 wherein each file is associated with a respective financial institution.

18. The system of claim 17 wherein the directory identifies that the filepath includes the routing in transit number (RTN) of a financial institution.

19. The system of claim 18 wherein a first subdirectory is identified by a segment of the unique identifier comprising the first three digits of the RTN.

20. The system of claim 18 wherein a second subdirectory is identified by a segment of the unique identifier comprising the middle three digits of the RTN.

21. The system of claim 18 wherein the file name is identified by a segment of the unique identifier comprising the last three digits of the RTN.

22. The system of claim 17 wherein the directory identifies that the filepath includes the bank identification number (BIN) of a financial institution.

23. The system of claim 22 wherein a first subdirectory is identified by a segment of the unique identifier comprising the first three digits of the BIN.

24. The system of claim 22 wherein the file name is identified by a segment of the unique identifier comprising the last three digits of the BIN.

25. The system of claim 17 wherein the specific file includes a pointer identifying another file including information regarding the on-line services offered by the respective financial institution.

26. The system of claim 25 wherein the information is used to configure a program module running on the client to utilize the on-line services offered by the financial institution.

27. The system of claim 17 wherein the request is in the form of a URL that includes the unique identifier.

28. A computer-readable medium on which is stored a program module for allowing a client computer to download information stored on a server, wherein the server maintains information relating to a plurality of institutions in respective files, the institution being identified by a unique identifier comprising a predetermined plurality of symbols and wherein each file on the server is identified by a unique filepath, the program module comprising instructions which, when executed by the client computer, performs the steps of:

transmitting, in response to input from a user of the client computer, a request to the server for a specific file, identified by a specific filepath which includes the unique identifier to be downloaded to the client;

searching the server using the specific filepath to locate the specific file, the server being responsive to parse the unique identifier into predetermined segments comprising a subset of said symbols, the segments corresponding respectively to a directory, at least one subdirectory, and a file name, with the server utilizing the segments of the unique identifier to locate the specific file as identified within the directory, the at least one subdirectory and the file name; and receiving the downloaded specific file from the server.

29. The medium of claim 28 wherein each file is associated with a respective financial institution.

30. The medium of claim 29 wherein the directory identifies that the filepath includes the routing in transit number (RTN) of a financial institution.

31. The medium of claim 30 wherein a first subdirectory is identified by a segment of the unique identifier comprising the first three digits of the RTN.

32. The medium of claim 30 wherein a second subdirectory is identified by a segment of the unique identifier comprising the middle three digits of the RTN.

33. The medium of claim 30 wherein the file name is identified by a segment of the unique identifier comprising the last three digits of the RTN.

34. The medium of claim 29 wherein the directory identifies that the filepath includes the bank identification number (BIN) of a financial institution.

35. The medium of claim 34 wherein a first subdirectory is identified by a segment of the unique identifier comprising the first three digits of the BIN.

36. The medium of claim 34 wherein the file name is identified by a segment of the unique identifier comprising the last three digits of the BIN.

37. The medium of claim 29 wherein the specific file includes a pointer identifying another file including information regarding the on-line services offered by the respective financial institution.

38. The medium of claim 37 wherein the information is used to configure a program module running on the client computer to utilize the on-line services offered by the financial institution.

39. The medium of claim 28 wherein the client is connected to the server through the Internet.

40. The medium of claim 28 wherein the client is connected to the server through a private dial-up network.

* * * * *